(12) United States Patent
Hattori (10) Patent No.: US 6,519,056 B1
(45) Date of Patent: Feb. 11, 2003

(54) HALFTONING DEVICE AND IMAGE FORMING APPARATUS

(75) Inventor: Toshiyuki Hattori, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/301,125

(22) Filed: Apr. 28, 1999

(30) Foreign Application Priority Data

Apr. 28, 1998 (JP) ............................................ 10-118848
Apr. 8, 1999 (JP) ............................................ 11-100881

(51) Int. Cl.⁷ ................................................ H04N 1/46
(52) U.S. Cl. ...................................... 358/3.09; 358/1.9
(58) Field of Search ................. 358/1.9, 429, 455–459, 358/534–536, 3.06–3.09; 382/237, 251–253

(56) References Cited

U.S. PATENT DOCUMENTS

| | | | |
|---|---|---|---|
| 4,814,886 A | | 3/1989 | Kuge et al. .................. 358/293 |
| 5,799,137 A | * | 8/1998 | Broddin et al. ............. 358/1.18 |
| 5,825,932 A | * | 10/1998 | Inoue ........................ 358/298 |
| 6,072,590 A | * | 6/2000 | Sano et al. .................. 358/1.9 |
| 6,226,103 B1 | * | 5/2001 | Klassen et al. .............. 358/1.9 |
| 6,249,355 B1 | * | 6/2001 | Trask ......................... 358/1.9 |

FOREIGN PATENT DOCUMENTS

| | | | |
|---|---|---|---|
| EP | 0 634 862 A1 | 1/1995 | ........... H04N/1/40 |
| EP | 0 680 195 A1 | 11/1995 | ........... H04N/1/40 |
| EP | 0 682 438 A1 | 11/1995 | ........... H04N/1/40 |
| EP | 0 740 459 A2 | 10/1996 | .......... H04N/1/405 |
| EP | 0 774 858 A2 | 5/1997 | ........... H04N/1/41 |
| JP | 61-189774 | 8/1986 | |
| JP | 5-284343 | 10/1993 | |
| JP | 10-75375 | 3/1998 | |

\* cited by examiner

Primary Examiner—Thomas D. Lee
Assistant Examiner—Stephen Brinich
(74) Attorney, Agent, or Firm—Sughrue Mion, PLLC (57) ABSTRACT

When a screen for halftoning of N×N pixel size is realized, gamma conversion cells, the number of which is N, are prepared for converting a pixel value of one pixel into a dot signal. When these N gamma conversion cells are repeatedly applied to N×N pixels by a predetermined order pattern, dots are respectively grown round N growing cores on the screen of N×N pixels.

13 Claims, 10 Drawing Sheets

HALFTONING DEVICE AND IMAGE FORMING APPARATUS

BACKGROUND OF THE INVENTION

1. Field of the Invention

The present invention relates to an image forming technique. More particularly, the present invention relates improvements in a technique of halftoning for converting the gradation of an image into a dot pattern.

The present application is based on Japanese Patent Applications No. Hei. 10-118848 and No. Hei. 11-100881, which are incorporated herein by reference.

2. Description of the Related Art

Concerning a digital image generated or inputted by a computer, a value of density of each pixel is expressed by a word capable of expressing a substantially continuous gradation such as 8-bit word. On the other hand, in an image forming apparatus represented by a digital printer used in a computer system, in general, a pseudo-continuous gradation image, which can be visually assumed to be an image of continuous gradation by human's eyes, is reproduced when minute points (dots) made of coloring agent of various density and various sizes are put in an image expressing medium. In the above image forming apparatus, it is necessary to provide a technique by which the gradation of an original image can be converted into a dot pattern by which the gradation of the original image can be reproduced as faithfully as possible. This technique is referred to as halftoning.

Conventionally, there are known various techniques of halftoning. Typical examples of techniques of halftoning are an error diffusion method and a dither method. Further, there is provided another technique which will be described as follows. Data of pixel values expressing various dot patterns (screens) corresponding to various gradations are previously stored in a memory, and data of pixel values of an appropriate screen are selectively read out and outputted responding to the original pixel values. This method is referred to as a screen method in this specification hereinafter. This screen method is mainly used for an electrophotographic image forming apparatus such as a laser printer in which printing of high speed is demanded, because the error diffusion method is difficult to be applied to the laser printer.

Figure 1:
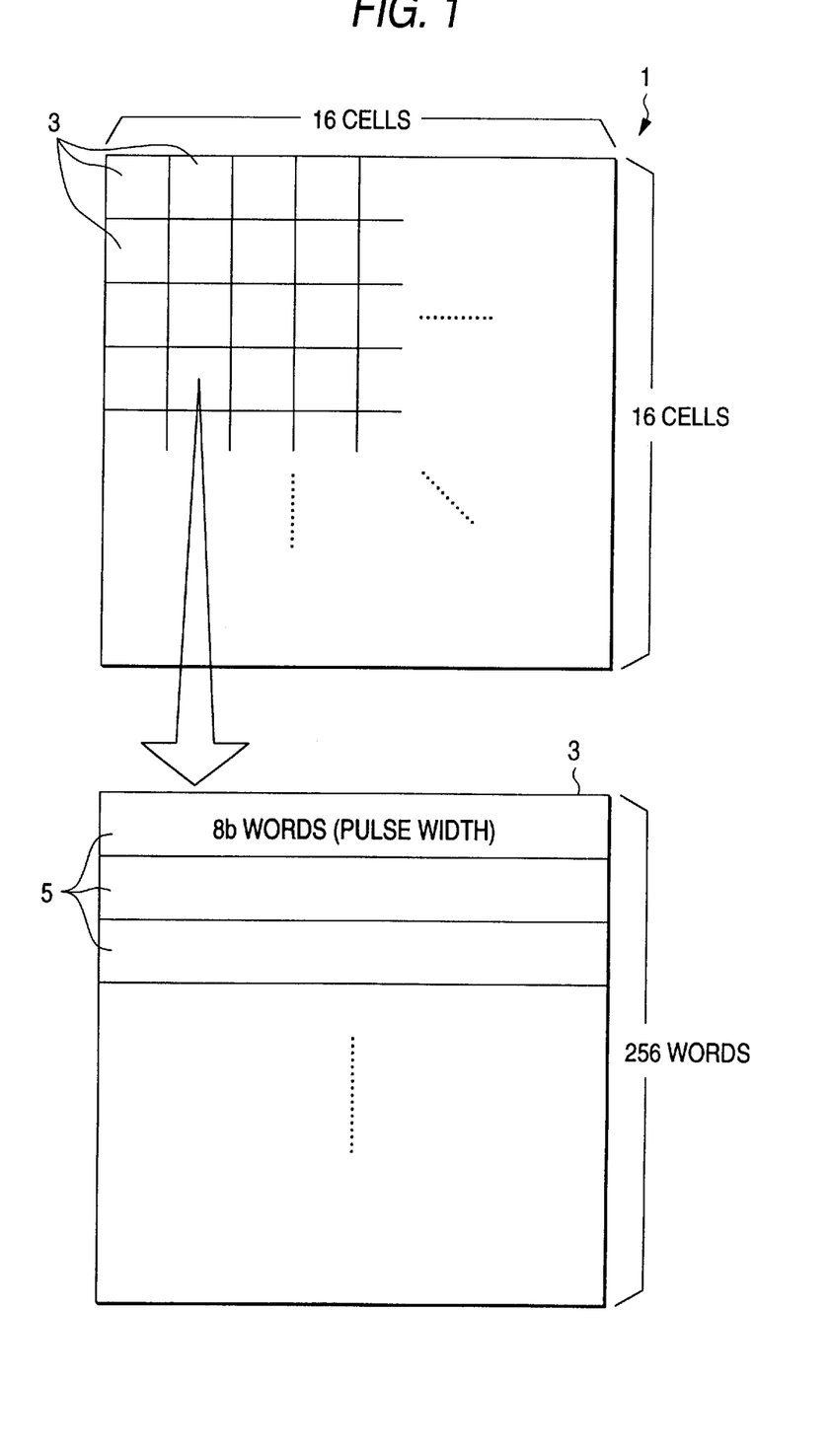
FIG. 1 is a view showing the structure of conventional screen data.

FIG. 1 is a view showing an example of screen data for the screen method used in a conventional laser printer.

These screen data express a screen for a region of 16×16 pixels on an image. These screen data are made as a gamma cell table 1 composed of gamma conversion cells 3, the number of which is 16×16. The individual cells 3 on the gamma cell table 1 correspond to individual pixels in the region of 16×16 pixels. In each cell 3, 256 laser pulse width values (8 bit words) corresponding to 256 gradation values, which can be taken by the original pixel values, are housed. The printer successively reads out a value of each pixel of the original image from a memory.

In the region of 16×16 pixels, from one gamma conversion cell 3 on the gamma cell table 1 corresponding to the pixel position, a laser pulse value corresponding to the pixel value is read in. When pulse width modulation is conducted on a drawing laser pulse according to the laser pulse width value which has been read in, a dot, the size of which corresponds to the pulse width value, is drawn at a position of the pixel on a sheet of printing paper. In this way, halftoning is conducted by using a screen of the pixel size of 16×16.

In order to conduct processing at high speed, screen data are housed in SRAM of high speed. However, according to the conventional technique, since a quantity of screen data is large, it is necessary to provide a large quantity of expensive SRAM, which raises the manufacturing cost. For example, in the case of the above screen, the pixel size of which is 16×16, SRAM of (8 b×256 words)×(16×16 pixels)=512 kb is consumed. Further, there is a demand for using a larger screen in order to enhance image quality, that is, there is a demand for using a larger screen, the size of which is, for example, 64×64 pixels. In the case of a screen of 64×64 pixels, a quantity of data becomes (8 b×256 words)×(64×64 pixels)=about 8 Mb, which is very large.

SUMMARY OF THE INVENTION

Therefore, it is an object of the present invention to halftone a large sized screen using a small capacity of memory.

The present invention is based on the following new knowledge. In general, designing is conducted in such a manner that dots grow from small points to large masses according to an increase in the gradation value of an original image, that is, according to an increase in density. Dots grow in the same manner as that of crystals. That is, each dot grows from a center, which is referred to as a growing core, to its periphery. The inventors made investigation into a relation between the growth of dots and the effect of halftoning. As a result of the investigation, the following were found. For example, when there are about 4 growing cores in the case of a screen of 4×4 pixels, or when there are about 8 growing cores in the case of a screen of 8×8 pixels, or when there are about 64 growing cores in the case of a screen of 64×64 pixels, it is possible to sufficiently exhibit the effect of halftoning which is expected for the screen of the size, that is, it is possible to exhibit the effect of faithfully reproducing the gradation in the pseudo manner. In short, in the case of a screen, the region of which is rectangular (square in a typical case), it is possible to sufficiently exhibit the effect of halftoning when the number of growing cores is approximately a square root of the number of pixels contained in the screen.

The halftoning device of the present invention accomplished according to this knowledge includes a conversion cell table to be used as screen data. This conversion cell table contains a plurality of conversion cells, the number of which is smaller than the number of pixels contained in a pixel matrix of a predetermined size. Conversion information for converting a pixel value of one pixel into a dot signal is housed in each conversion cell. Conversion information has a conversion characteristic for converting a pixel value into a dot signal. The conversion characteristic is different at each conversion cell. When these conversion cells are applied to a plurality of pixels, which form a mass, it is possible to make a dot growing pattern, the center of which is one growing core.

The halftoning device of the present invention comprises: a cell designation section for designating one of the conversion cells on the conversion cell table with respect to each pixel position on the pixel matrix; and a processing section for determining a pixel position on the pixel matrix of each inputted pixel of an inputted image by applying the pixel matrix to the inputted image, the processing section also for converting the pixel value of each inputted pixel into a dot signal by using a conversion cell designated by the cell designation section with respect to the determined pixel position.

According to the method of halftoning of the present invention, a pixel position of each input pixel on the pixel matrix is determined. According to the determined pixel position of each input pixel, one of the plurality of conversion cells contained in the conversion cell table is designated for each input pixel, and the pixel value of each input pixel is converted into a dot signal by using the conversion cell designated for each input pixel.

According to the present invention, the number of conversion cells on the conversion cell table is smaller than the number of the pixels of the pixel matrix which is covered by the screen for halftoning. Therefore, a quantity of screen data is smaller than that of the conventional art. According to the new knowledge described above, in the case of a screen, the pixel size of which is N×N, it is possible to provide a sufficiently high effect when the growing cores, the number of which is N, exist. Therefore, it is possible to provide a sufficiently high effect when the conversion cells on the conversion cell table, the number of which is approximately N, exist, wherein N is a number obtained when N×N of the screen size is divided by the number N of the growing cores. This means that a quantity of screen data is reduced to about 1/N compared with that of the conventional art.

In a preferred embodiment of the present invention, referring to a lookup table which is referred to as an index table, a conversion cell to be applied to each input pixel is selected. On this index table, there are housed indexes indicating the conversion cells for all pixel positions on the pixel matrix. A quantity of data on the index table is much smaller than that on the conversion cell table.

In another preferred embodiment, conversion cell to be applied to each input pixel is calculated and determined by a pixel position (for example, the line number and the row number) of the input pixel on the pixel matrix. Therefore, the above index table is not required.

Typically, the present invention is carried out by an exclusive hardware, however, of course, it is possible to carry out the present invention by a computer. In this case, the computer program can be installed or loaded into the computer via various media such as a disk type storage, semiconductor memory, correspondence net work and so forth.

Features and advantages of the invention will be evident from the following detailed description of the preferred embodiments described in conjunction with the attached drawings.

DETAILED DESCRIPTION OF THE PREFERRED EMBODIMENTS

Figure 2A:
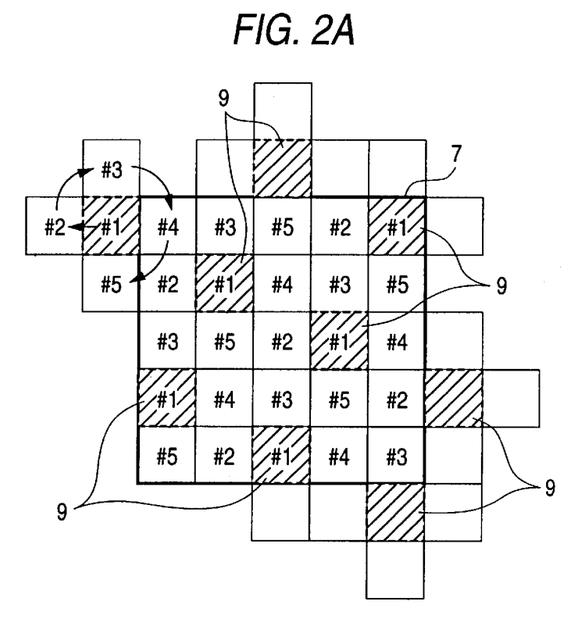
FIGS. 2A and 2B are views showing a simple example for explaining the principle of the present invention.
Figure 2B:
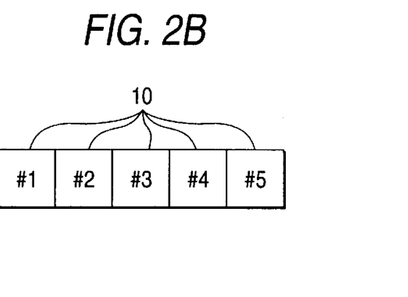

FIGS. 2A and 2B are views showing a simple example of the principle of the present invention in the case of a screen of 5×5 pixels.

As shown in FIG. 2A, on the screen 7 of 5×5 pixels, which is surrounded by a bold line, there exist five pixels 9, which are hatched, and these five pixels 9 function as growing cores. When the density of the image region corresponding to the screen 5 of 5×5 pixels is 0%, all pixels including the growing cores 9 are empty. However, when the density becomes approximately 20%, first, dots are formed only in portions of five growing cores 9 as shown in the drawing. Further, when the density is increased to 40%, 60%, 80% and 100%, as shown by arrows on the left of FIG. 2, dots are added to the periphery of the growing core 9 of #1 in the order of #2, #3, #4 and #5. In this case, in order to simplify the explanations, a rough example of the growth of a unit pixel is shown. However, in the case of a screen to be actually used, a dot can grown more accurately by a unit smaller than one pixel. In the above growth of dots, when about five growing cores 9 exist on the screen 7 of 5×5 pixels as shown in the drawing, it is possible to obtain a halftoning effect which can be expected to the screen 7 of 5×5 pixels.

In order to make the screen 7 of 5×5 pixels, it is sufficient to prepare five gamma conversion cells 10 shown in FIG. 2B. Accordingly, a quantity of screen data is greatly reduced.

Figure 3:
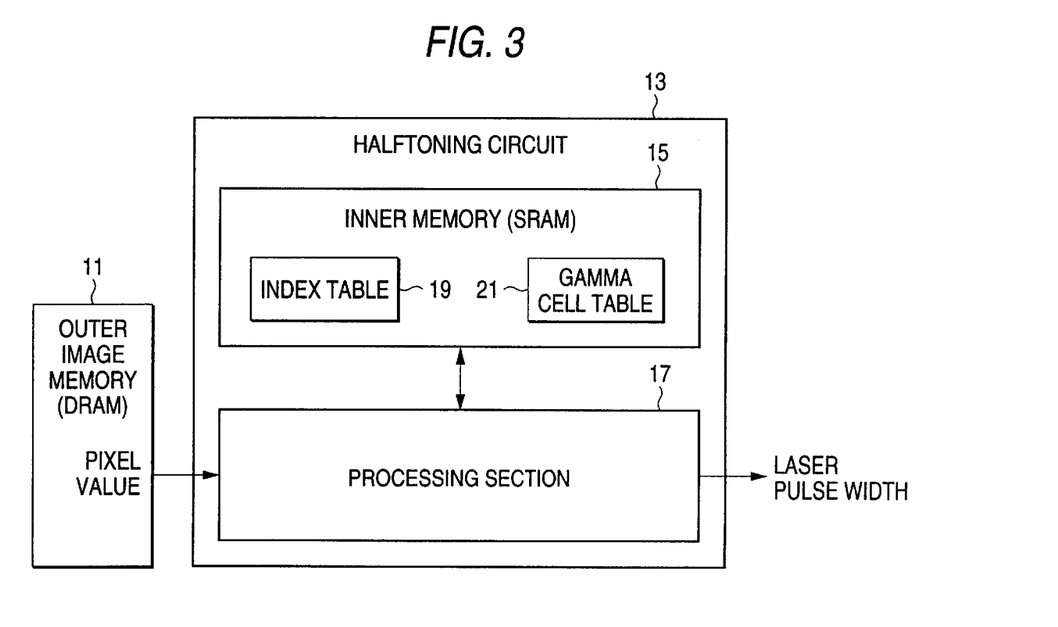
FIG. 3 is a block diagram showing the structure of an embodiment of the present invention.

FIG. 3 is a view showing an outline of the structure of a halftoning circuit in a laser printer of an embodiment of the present invention.

The halftoning circuit 13 includes an inner memory 15, in which, for example, SRAM is used, and a processing section 17 which is a hardware logic circuit. The inner memory 15 houses screen data composed of two tables, one is an index table 19 and the other is a gamma cell table 21. The processing section 17 reads each pixel value (typically, one color component value of one pixel is 8 bit word) of the original continuous gradation image from the outer image memory 11 in which, for example, DRAM is used. When the index table 19 in the inner memory 15 and the gamma cell table 21 are referred, a laser pulse width showing a dot size corresponding to the pixel value, which has been read in, is determined, and this laser pulse width signal is outputted. According to this laser pulse width signal, a laser printing engine not shown conducts pulse width modulation on a drawing laser pulse, and a pseudo continuous gradation image is reproduced on a sheet of paper by the electrophotographic method.

Figure 4:
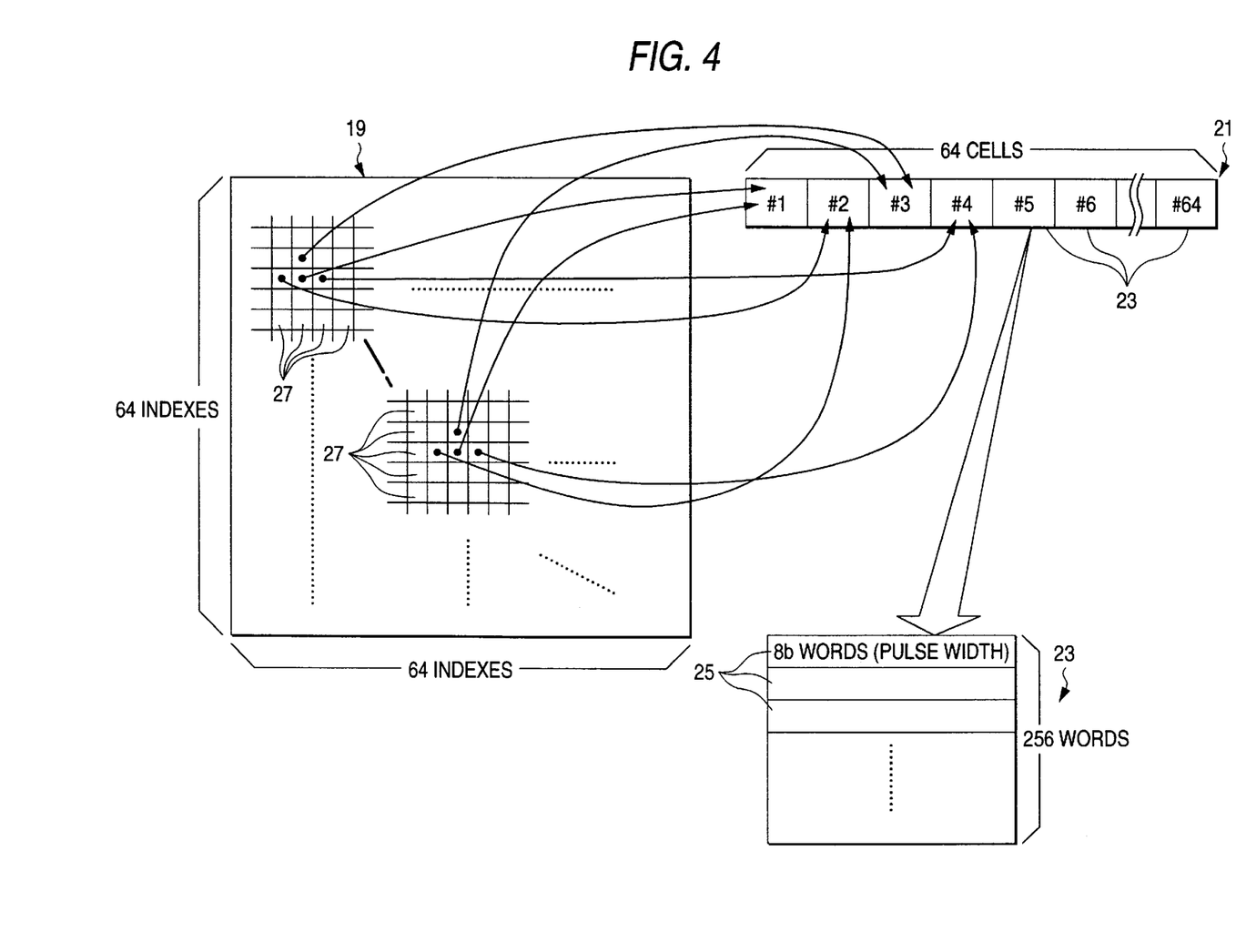
FIG. 4 is a view showing the structure of screen data.

FIG. 4 is a view showing an index table 19 and a gamma cell table 21.

These matrixes 19, 21 express a screen of 64×64 pixel size. The gamma cell table includes 64 gamma conversion cells 23. Each gamma conversion cell 23 can be made to correspond to one pixel. Each gamma conversion cell 23 houses 256 laser pulse width values (8 bit word) 25 respectively corresponding to 256 gradations which can be taken by one pixel value (one color component is 8 bit word) of an original image. As shown in the drawing, cell numbers #1, #2, . . . , #64 are respectively allotted to 64 gamma conversion cells 23. This gamma cell table 21 expresses a dot growing pattern in a region composed of 64 pixels, at the center of which one growing core is located.

This growing pattern is described as follows. According to a gradual increase in the image density from 0, for example, a first dot, which is a growing core, appears in a pixel corresponding to #1 cell. Successively, dots are multiplied into pixel regions corresponding to other cells in the order of #2, #3, . . . , #64 while the growing core becomes a starting point of multiplication.

The index table 19 is composed of 64×64 indexes 27 corresponding to 64×64 pixel regions on an original image. Each index 27 corresponds to each pixel in 64×64 pixel regions. Each index 27 houses a cell number of one gamma conversion cell 23 on the gamma cell table 21. From the theoretical viewpoint, it is sufficient that the cell number is 6 bits, however, the cell number is an 8 bit word in the actual use. As shown by an arrow in the drawing, each index 27 designates one gamma conversion cell 23 on the gamma cell table 21 by a cell number housed in the index 27.

The indexes 27, the number of which is 64×64, on the index table 19 repeatedly designate 64 gamma conversion cells 23 on the gamma cell table 21 according to a predetermined order pattern so that 64 growing cores can be dispersed in the corresponding 64×64 pixel regions and dots can be grown round the 64 growing cores according to an increase in the image density. In the principle, the above is the same as a case in which the cell 10 shown in FIG. 2B is repeatedly applied to each pixel in the region 7 of 5×5 pixels shown in FIG. 2A in the order pattern of #4, #3, #5, #2 and #1. As described above, when 64 growing cores exist in the region of 64×64 pixels, it is possible to obtain a halftoning effect expected by the screen of 64×64 pixels.

In this case, a quantity of data on the gamma cell table 21 is 8 b×256 words×64 cells=131 kb. A quantity of data on the index table 19 is 8 b×(64×64 indexes)=32 kb. The total is 164 kb, which is much smaller than a quantity of screen data, which is 8 Mb, of the conventional pixel size.

Figure 5:
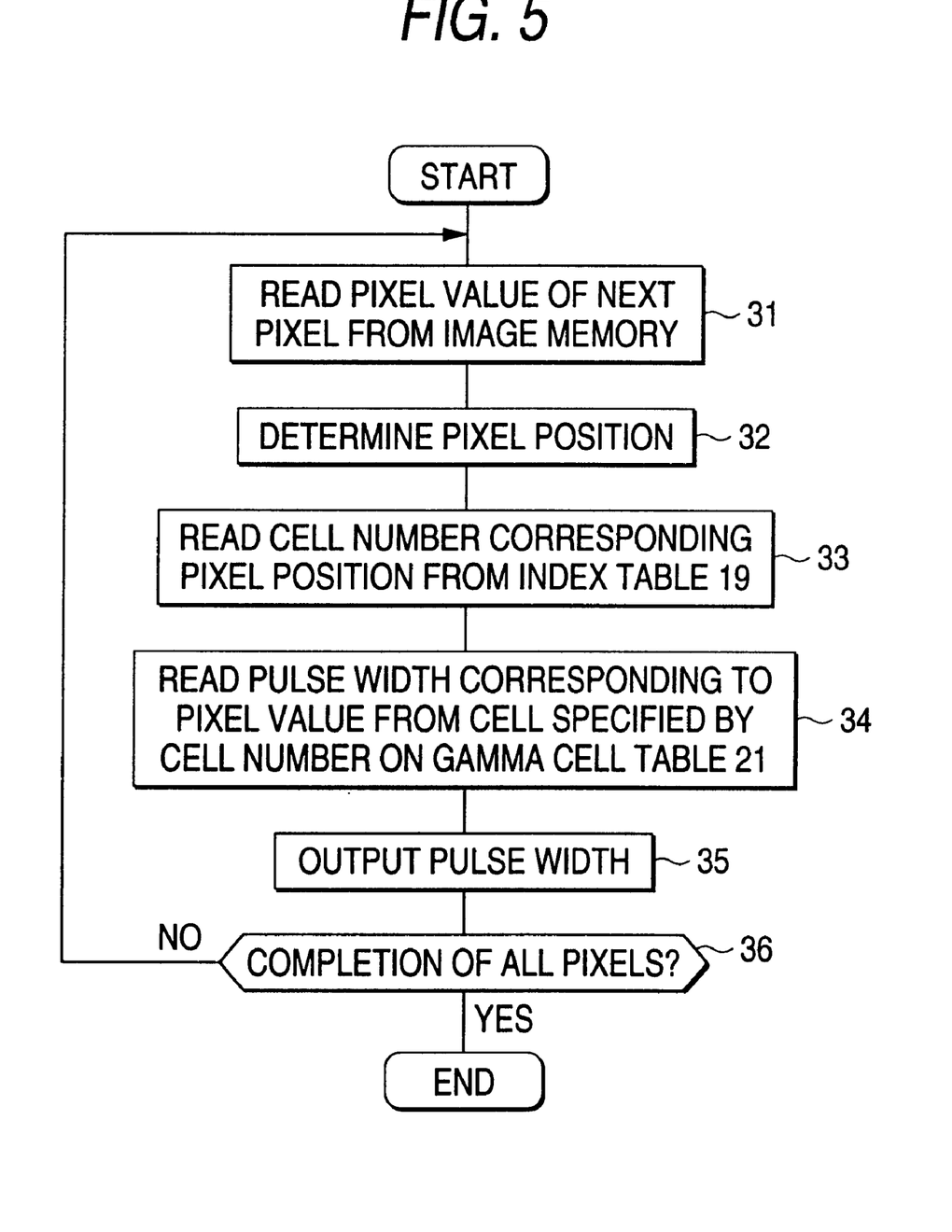
FIG. 5 is a flow chart showing operation of a processing section.

FIG. 5 is a flow chart showing operation of the processing section 17 of the halftoning circuit 13.

First, a pixel value of a pixel on the original image is read from the image memory 11 (step 31). Next, a pixel position of the pixel in the region of 64×64 pixels is determined (step 32). Next, a cell number is read from the index 27 on the index table 19 corresponding to the pixel position (step 33). Then, a laser pulse width value corresponding to the pixel value which has been read in step 31 is read from one gamma conversion cell 23 on the gamma cell table 21 designated by the cell number (step 34). Then, the pulse width value, which has been read, is outputted (step 35). A laser printing engine not shown conducts pulse width modulation on a drawing laser beam for drawing a dot at the pixel position according to the pulse width value. The above operation is repeated for all pixels on the original image (step 36).

In this connection, concerning the screen for halftoning, the most appropriate dot growing pattern changes according to a type of an image (for example, a text such as characters and marks, graphics such as lines and figures, natural images such as photographs and painted pictures), a type of image such as a color image or monochromatic image, and preference of a user. Therefore, it is possible to select an appropriate screen from a plurality of types of screens according to the type of an image. In order to select an appropriate screen, there are provided various methods. As an example, the following method can be adopted. In FIG. 3, there are prepared a plurality of index tables 19 for designating cells in the gamma cell table 21 by an order pattern so that original growing patterns of different dots can be respectively made in the inner memory 13. These index tables 19 are respectively given peculiar screen numbers. Pixel values of the original image are composed of color components of three or four colors such as RGB, CYM or CMYK, wherein the color components are usually 8 bit words. In addition to that, the screen number (for example, 8 bit word) is contained in the pixel value as an additional component. For example, a screen number of the index table 19 most appropriate for printing a text is contained in the pixel value of the pixel existing in the text region, and a screen number of the index table 19 most appropriate for printing a natural image is contained in the pixel value of the pixel existing in the natural image region. Due to the foregoing, various screens can be selectively used without causing an increase in a quantity of data.

Figure 6:
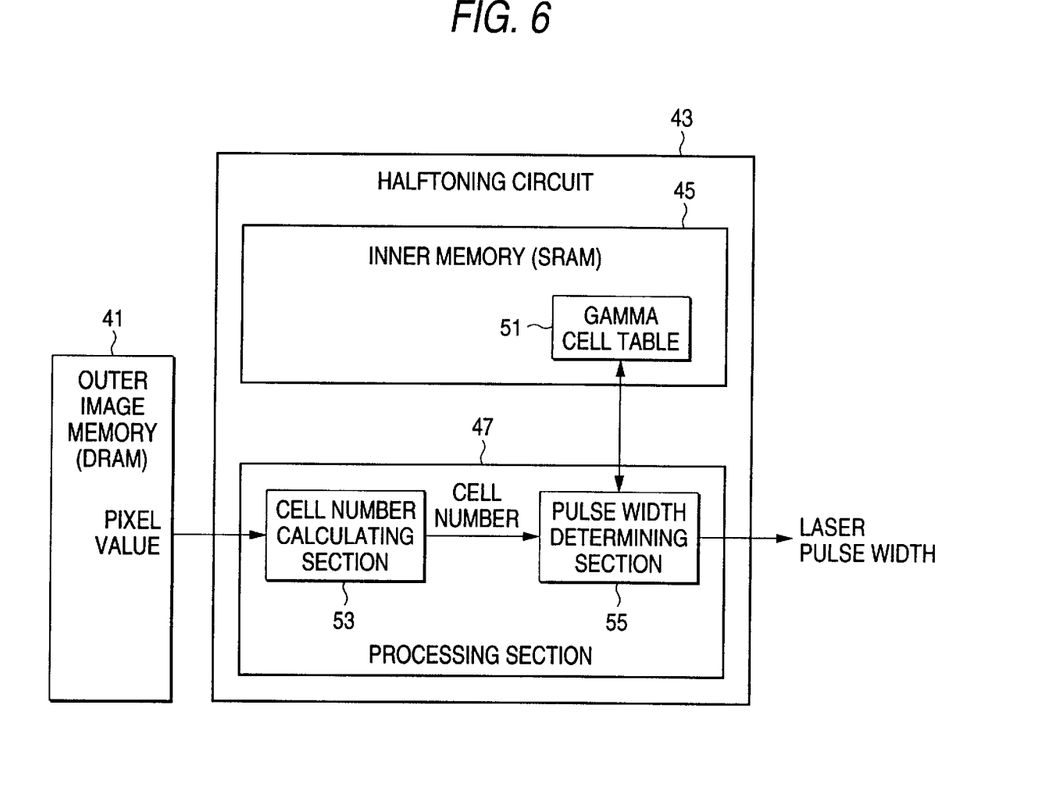
FIG. 6 is a block diagram showing the structure of another embodiment of the present invention.

FIG. 6 is a view showing an outline of the structure of a halftoning circuit in a laser printer of another embodiment of the present invention.

The halftoning circuit 43 includes an inner memory 45, in which, for example, SRAM is used, and a processing section 47 which is a hardware logic circuit. The inner memory 45 houses a gamma cell table 51. In the case of a screen of N×N pixels, this gamma cell table 51 has N gamma conversion cells. That is, for example, in the case of a screen of 5×5 pixels, this gamma cell table 51 has the same structure as that of the gamma cell table shown in FIG. 2B. In the case of a screen of 64×64 pixels, this gamma cell table 51 has the same structure as that of the gamma cell table 21 shown in FIG. 4.

The processing section 47 includes a cell number calculating section 53 and a pulse width determining section 55. The cell number calculating section 53 reads a pixel value (typically, one color component value of one pixel is an 8 bit word) of each pixel of the original continuous gradation image from the outer image memory (for example DRAM) 41. Then, the cell number calculating section 53 calculates a position of each pixel in the region of N×N pixels. According to the thus calculated pixel position, the cell number calculating section 53 calculates a cell number of one gamma conversion cell on the gamma cell table 21 to be applied to each pixel. Since the cell number calculating section 53 determines a gamma conversion cell to be applied to each pixel by calculation, the inner memory 45 does not have a table corresponding to the index table 19 described in the previous embodiment shown in FIGS. 3 and 4. Due to the foregoing, the size of the inner memory 45 can be decreased, and the manufacturing cost can be reduced.

Referring to a gamma conversion cell on the gamma cell table 51 designated by a cell number calculated by the cell number calculating section 53, the pulse width determining section 55 of the processing section 47 determines a laser pulse width showing a dot size corresponding to the pixel value which has been read in from the image memory 41.

Then, the pulse width determining section 55 outputs this laser pulse width signal. According to this laser pulse width signal, a laser printing engine not shown conducts pulse width modulation on a drawing laser pulse, and a pseudo continuous gradation image is reproduced on a sheet of paper by the electrophotographic method.

Figure 7:
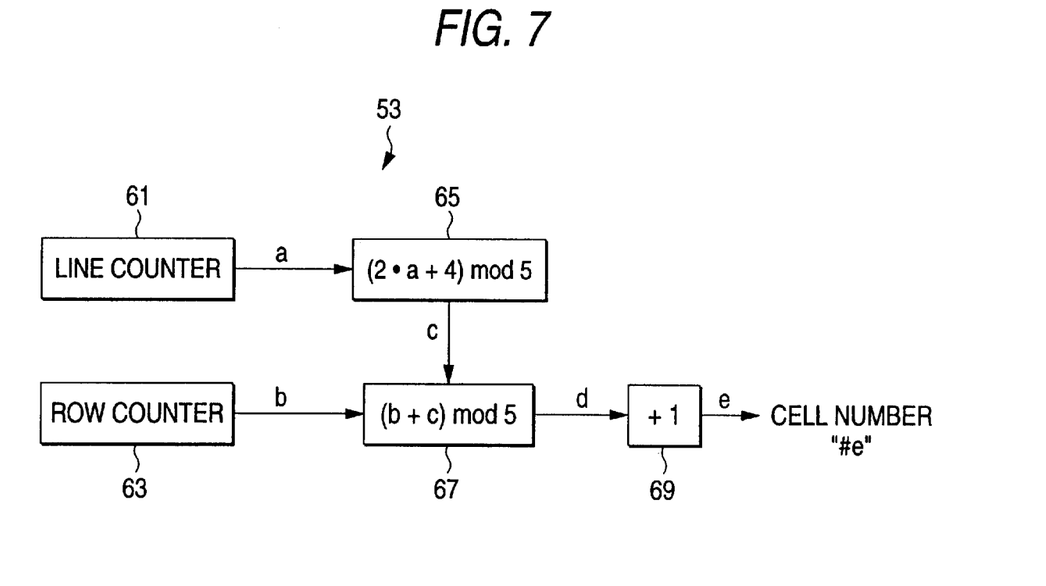
FIG. 7 is a block diagram showing an example of the structure of a cell number calculating section in the case of a screen of 5×5 pixels.
Figure 8:
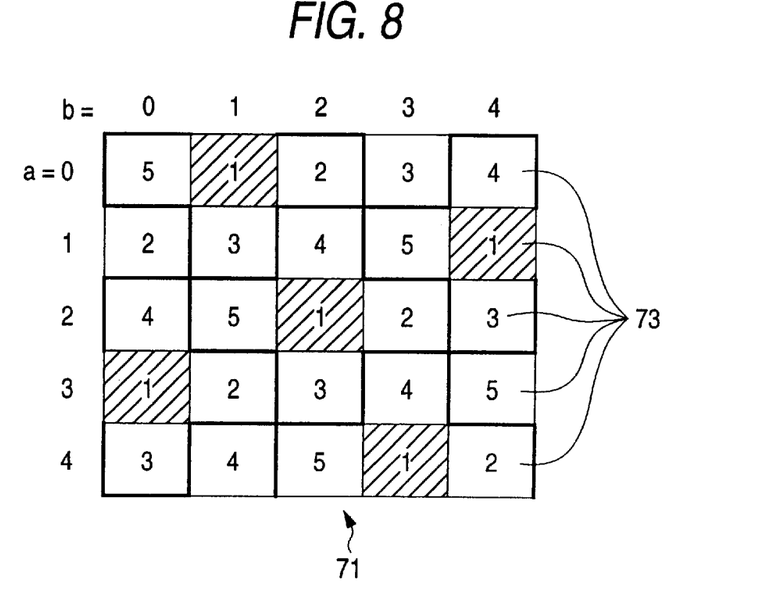
FIG. 8 is a schematic illustration showing cell numbers calculated for pixels in a region of 5×5 pixels by the cell number calculating section shown in FIG. 7.

FIG. 7 is a view showing an example of the structure of the cell number calculating section 53 in the case of a screen of 5×5 pixels. FIG. 8 is a view showing cell numbers calculated by the cell number calculating section 53 for the pixels 73 in the region 71 of 5×5 pixels.

As shown in FIG. 7, the cell number calculating section 53 includes a line counter 61, row counter 63, line modulo calculator 65, row modulo calculator 67 and adder 69. Both the line counter 61 and the row counter 63 are ring counters for counting up from 0 to 4. With respect to each pixel which has been read in from the image memory 41 shown in FIG. 6, the cell number calculating section 53 counts the respective position in the region of 5×5 pixels, that is, the cell number calculating section 53 counts the line number "a" and the row number "b". As shown in FIG. 8, in the region 71 of 5×5 pixels, the line number "a" of the uppermost line is 0, and when it is shifted downward by one line, the line number "a" is increased by 1. The row number of the left end row is 0, and when it is shifted to the right by one row, the row number "b" is increased by 1.

Referring to FIG. 7 again, the line modulo calculator 65 calculates [c=(2•a+4) mod 5] by using the line number "a" sent from the line counter 61. In this case, modulo calculation [(X) mod Y] is defined as finding the surplus when integer X is divided by integer Y. Therefore, the result of modulo 5 calculation [(X) mod 5] is any integer from 0 to 4. The adder 67 adds the row number "b", which has been sent from the row counter 63, to the calculated value "c" which has been sent from the line modulo calculator 65. The row modulo calculator 67 calculates [d=(b+c) mod 5] by using the row number "b", which has been sent from the row counter 63, and also using the calculated value "c" which has been sent from the line modulo calculator 65. The adder 69 adds +1 to the calculated value "d" sent from the row modulo calculator 67, and the thus obtained value e (=d+1) is determined to be a cell number. In this case, +1 is added for the object of adjusting the range from 0 to 4 of the output value of the row modulo calculator 67 to the range from 1 to 5 of the cell number.

Figure 9:
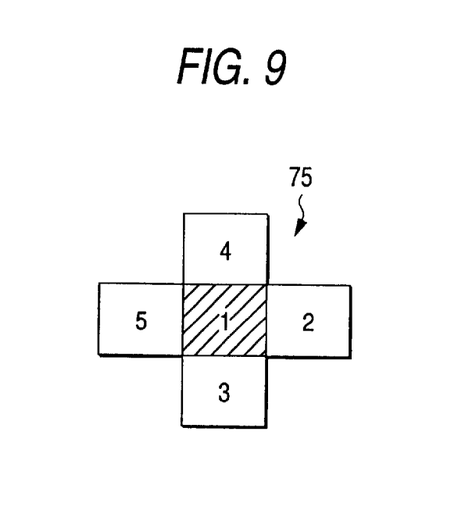
FIG. 9 is a schematic illustration showing a dot growing pattern of five pixels, which grow round one growing core, in the region of 5×5 pixels shown in FIG. 8.

As a result of the calculation of the cell numbers, as shown in FIG. 8, dot growing patterns, which are surrounded by bold lines, formed round five pixels (growing cores), which are hatched, the cell number of which is 1, are dispersed in the region 71 of 5×5 pixels. As shown in FIG. 9, each dot growing pattern is a cross pattern 75 composed of five pixels. This has the substantially same density expression ability as that of the each dot growing pattern in the region 7 of 5×5 pixels shown in FIG. 2A.

Figure 10:
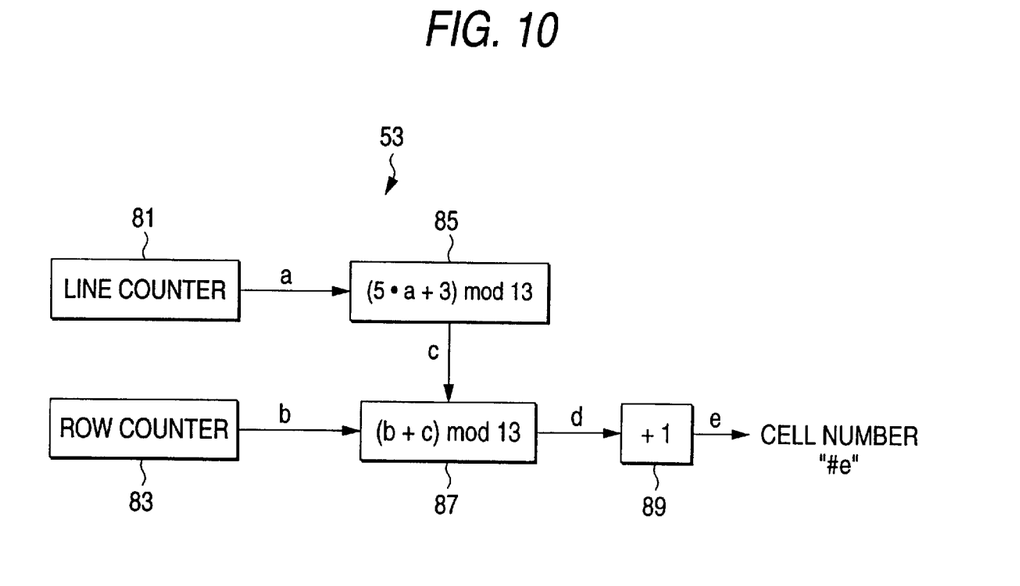
FIG. 10 is a block diagram showing an example of the structure of the cell number calculating section in the case of a screen of 13×13 pixels.
Figure 11:
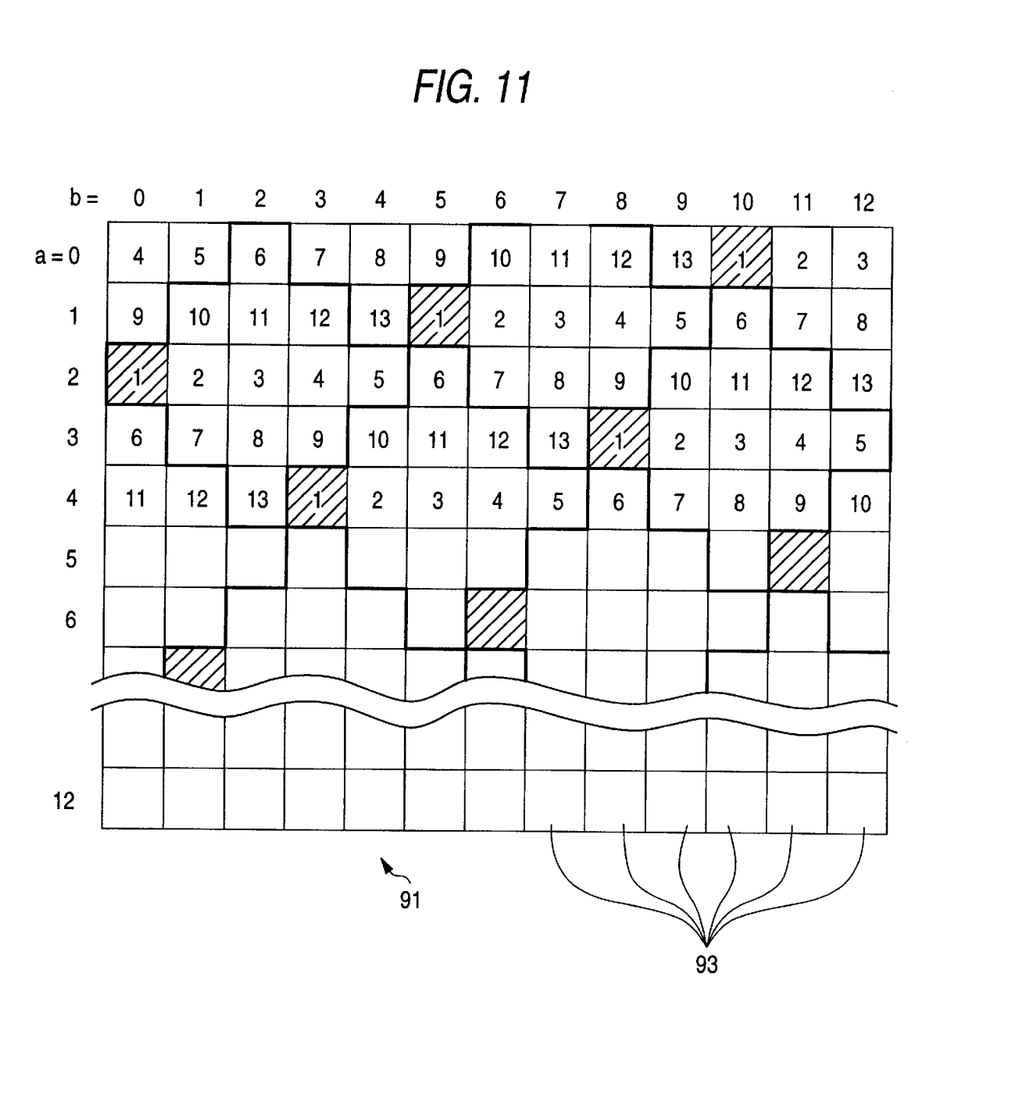
FIG. 11 is a schematic illustration showing cell numbers calculated for pixels in a region of 13×13 pixels by the cell number calculating section shown in FIG. 10.

FIG. 10 is a view showing an example of the structure of the cell number calculating section 53 in the case of a screen of 13×13 pixels. FIG. 11 is a view showing cell numbers calculated by the cell number calculating section 53 shown in FIG. 10 for the pixels 93 in the region 91 of 13×13 pixels. In this connection, in the case of a screen of 13×13 pixels, 13 gamma conversion cells, the numbers of which are 1 to 13, are contained on the gamma cell table 51 shown in FIG. 6.

In FIG. 10, both the line counter 81 and the row counter 83 are ring counters for counting up from 0 to 12. With respect to each pixel which has been read in from the image memory 41 shown in FIG. 6, the counters respectively count the positions in the region 91 of 13×13 pixels as shown in FIG. 11, that is, the counters respectively count the line number "a" and the row number "b". The line modulo calculator 85 calculates [c(5•a+3)mod 13] by using the line number "a" sent from the line counter 81.

The row modulo calculator 87 calculates [d(b+c) mod 13] by using the row number "b", which has been sent from the row counter 83, and also using the calculated value "c" which has been sent from the line modulo calculator 85. The adder 89 adds +1 to the calculated value "d" sent from the row modulo calculator 87, and the thus obtained value e (=d+1) is determined to be a cell number. In this case, +1 is added for the object of adjusting the range from 0 to 12 of the output value of the row modulo calculator 87 to the range from 1 to 13 of the cell number.

As a result of the calculation of the cell numbers, as shown in FIG. 11, dot growing patterns of the region of 13×13 pixels, which are surrounded by bold lines, formed round 13 pixels (growing cores), which are hatched, the cell number of which is 1, are dispersed in the region 91 of 13×13 pixels. Each dot growing pattern roughly grows in such a manner that the dot starts growing at the central line and extends to the upper and the lower row.

The halftoning circuit 43 shown in FIG. 6 can be realized on not only the screens of 5×5 and 13×13 pixels but also the general screen of N×N pixels. In this case, it is possible to use the cell number calculator 53, the structure of which is shown in FIG. 12 or 13.

Figure 12:
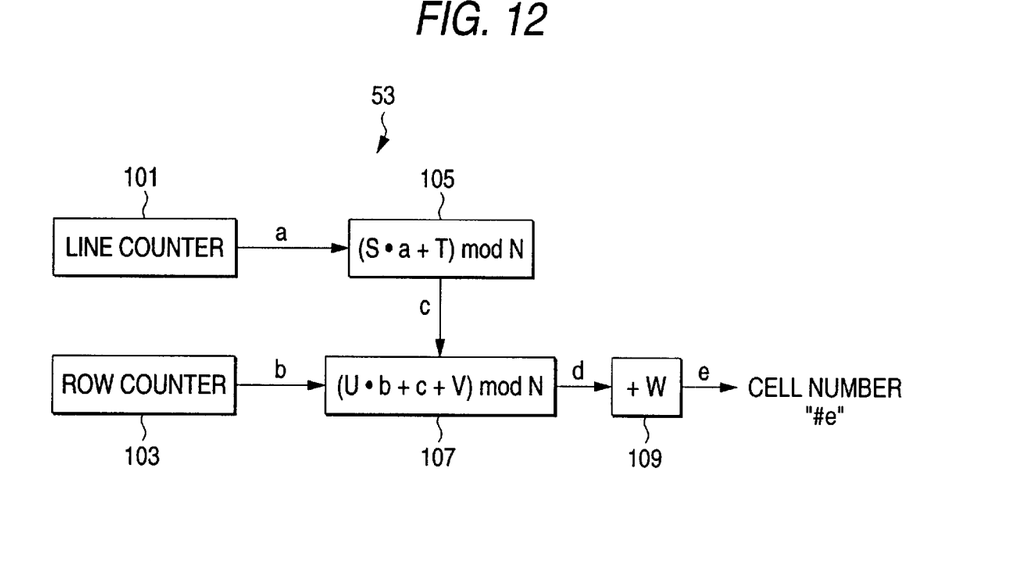
FIG. 12 is a block diagram showing an example of the structure of the cell number calculating section in the case of a screen of N×N pixels.

In the cell number calculator 53 shown in FIG. 12, the line modulo calculator 105 calculates [c(S•a+T) mod N] by using the line number "a", the row modulo calculator 107 calculates [d=(U•b+c+V) mod N] by using the row number "b" and the result "c" of calculation of the line modulo, and the adder 109 adds adjustment value W to the result "d" of calculation of the row modulo and outputs the cell number "e". In the cell number calculator 53 shown in FIG. 13, the row modulo calculator 107 calculates [d=(U•b+V) mod N] by using the row number "b", the line modulo calculator 105 calculates [c=(S•a+d+T) mod N] by using the line number "a" and the result "d" of calculation of the line modulo, and the adder 109 adds adjustment value W to the result "c" of calculation of the line modulo and outputs the cell number "e".

Figure 13:
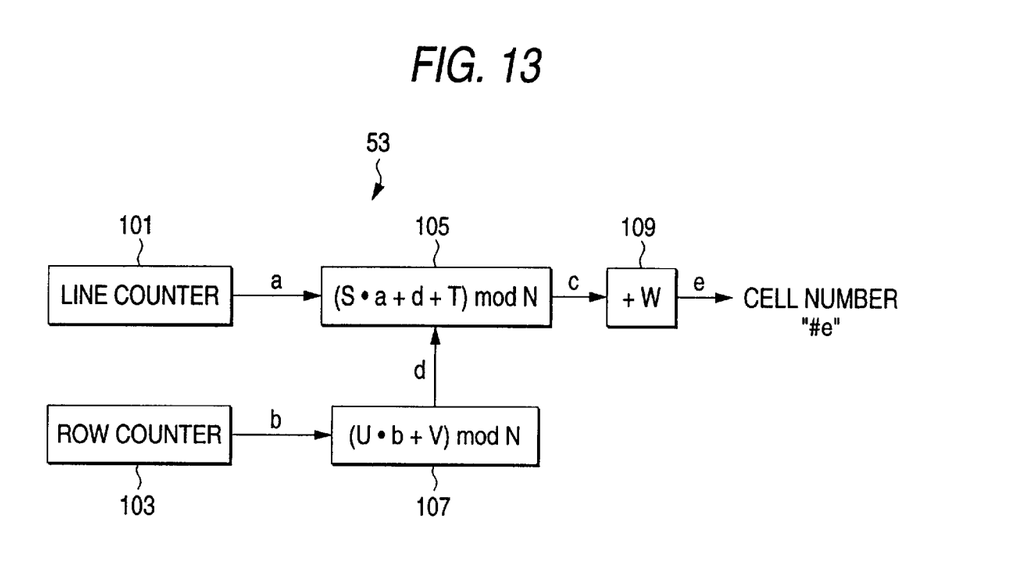
FIG. 13 is a block diagram showing another example of the structure of the cell number calculating section in the case of a screen of N×N pixels.

In FIGS. 12 and 13, constant S defines an increment of the cell number with respect to the increment 1 of the line number "a", constant U defines an increment of the cell number with respect to the increment 1 of the line number "b", and constants T and V define the cell number with respect to the pixel located at the position of (a, b)=(0, 0). Adjustment value W adjusts the range from 0 to (N−1) of the modulo calculation value, to the range from W to (W+N) of the cell number.

Figure 14:
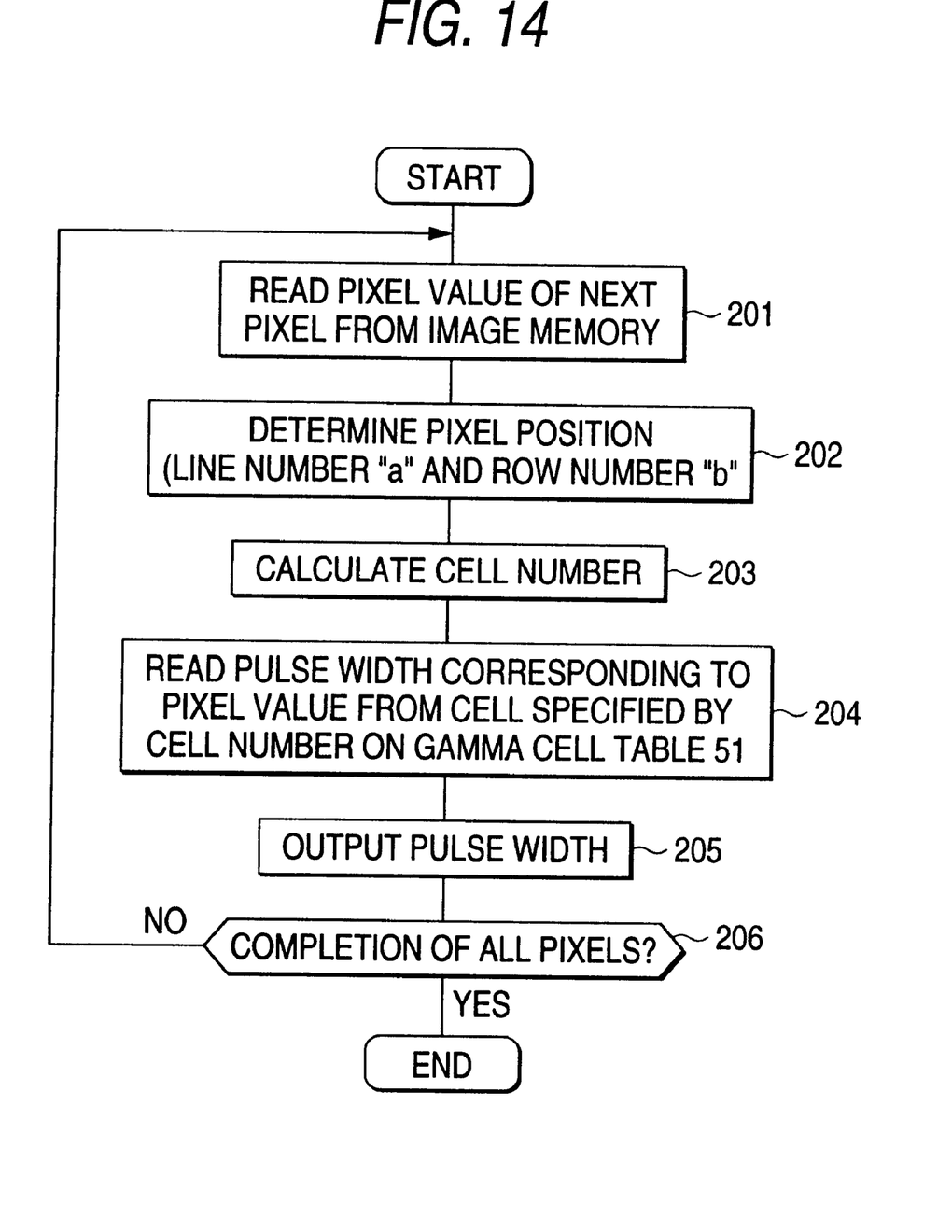
FIG. 14 is a flow chart showing operation of the processing section in the halftoning circuit shown in FIG. 6.

FIG. 14 is a view showing operation of the processing section 47 of the halftoning circuit 43 shown in FIG. 6.

First, a pixel value of a pixel on the original image is read in from the image memory 41 (step 201). Next, a pixel position in a pixel region corresponding to a screen of the pixel is determined, that is, the line number "a" and the row number "b" are determined (step 202). Next, a cell number for the pixel is calculated from the line number "a" and the row number "b" (step 203). Next, a laser pulse width value corresponding to the pixel value, which has been read in step 201, is read in from one gamma conversion cell on the gamma cell table 51 designated by the cell number (step 204). Then, the thus read pulse width value is outputted (step 205). A printing engine not shown in the drawing conducts pulse width modulation on the drawing laser beam for drawing dots at the pixel positions according to the pulse width value. The above operation is repeated for all pixels on the original image (step 206).

One embodiment of the present invention has been explained above. However, it should be noted that the above embodiment is taken up as an example only for the object of explaining the present invention, and the present invention is not limited to the above specific embodiment. Therefore, variations may be made by one skilled in the art. For example, the halftoning device of the present invention can be carried out by not only the exclusive hardware circuit shown in the above embodiment but also software for which a computer is used. The present invention can realize not only the screen, which is shown above, having a regular concentration type dot growing pattern, but also a screen having an irregular dot growing pattern and a screen having a dispersion type dot growing pattern. Also, the present invention can realize not only a square screen, the size of which is N×N pixels, but also a rectangular screen, the size of which is N×M pixels.

What is claimed is:

1. A halftoning device comprising:
    a conversion cell table containing a plurality of conversion cells, number of which is smaller than number of pixels contained in a pixel matrix of a predetermined size, each conversion cell having conversion information which is different at each conversion cell for converting a pixel value into a dot signal;
    a cell designation section for designating one of the conversion cells on said conversion cell table with respect to each pixel position on the pixel matrix; and
    a processing section for determining the pixel position on the pixel matrix of each inputted pixel of an inputted image by applying the pixel matrix to the inputted image, thereby converting the pixel value of each inputted pixel into a dot signal by using said conversion cell designated by said cell designation section with respect to said determined pixel position.

2. A halftoning device according to claim 1, wherein the pixel matrix is a rectangular region.

3. A halftoning device according to claim 1, wherein said cell designation section designates the conversion cell to each pixel position on the pixel matrix so that a regular dot growing pattern having a plurality of growing cores dotted on the pixel matrix can be formed.

4. A halftoning device according to claim 1, wherein the cell designation section designates the conversion cell to each pixel position on the pixel matrix so that an irregular dot growing pattern having a plurality of growing cores dotted on the pixel matrix can be formed.

5. A halftoning device according to claim 1, wherein the size of the pixel matrix is N×N, and said cell designation section designates the conversion cell to each pixel position on the pixel matrix so that a dot growth pattern having dotted growth cores, number of which is approximately N, can be formed on the pixel matrix.

6. A halftoning device according to claim 1, wherein said cell designation section has an index table on which one of the conversion cells is previously designated to each of the pixel positions on the pixel matrix.

7. A halftoning device according to claim 1, wherein said cell designation section designates one of the conversion cells to each pixel position on the pixel matrix by the calculation in which each pixel position is used.

8. A halftoning device according to claim 1, wherein the pixel value is a gradation value, and the dot signal is a pulse width signal for conducting pulse width modulation on a drawing pulse.

9. A method of halftoning comprising the steps of:
    determining a pixel position of each inputted pixel on an inputted image in a pixel matrix when the pixel matrix of a predetermined size is applied to the inputted image;
    designating one of the plurality of conversion pixels contained in a conversion cell table to each inputted pixel according to the pixel position of each inputted pixel, wherein number of the conversion cells on the conversion cell table is smaller than number of pixels contained in the pixel matrix, and each conversion pixel has a piece of conversion information different at each conversion cell for converting a pixel value into a dot signal; and
    converting the pixel value of each inputted pixel into a dot signal by using the conversion cell designated to each inputted image.

10. An image forming apparatus comprising:
    a halftoning device for converting a pixel value of an original image into a dot signal, said halftoning device comprising:
        a conversion cell table containing a plurality of conversion cells, number of which is smaller than number of pixels contained in a pixel matrix of a predetermined size, each conversion cell having conversion information which is different at each conversion cell for converting a pixel value into a dot signal;
        a cell designation section for designating one of the conversion cells on said conversion cell table with respect to each pixel position on the pixel matrix; and
        a processing section for determining the pixel position on the pixel matrix of each inputted pixel of an inputted image by applying the pixel matrix to the inputted image, thereby converting the pixel value of each inputted pixel into a dot signal by using said conversion cell designated by said cell designation section with respect to said determined pixel position; and
    an image reproducing device for reproducing an image on which gradation of the original image is expressed in a pseudo manner according to the dot signal sent from said halftoning device.

11. A method of forming an image comprising the steps of:
    determining a pixel position of each inputted pixel on an inputted image in a pixel matrix when the pixel matrix of a predetermined size is applied to the inputted image;
    designating one of the plurality of conversion pixels contained in a conversion cell table to each inputted pixel according to the pixel position of each inputted pixel, wherein number of the conversion cells on the conversion cell table is smaller than number of pixels contained in the pixel matrix, and each conversion pixel has a piece of conversion information different at each conversion cell for converting a pixel value into a dot signal;
    converting the pixel value of each inputted pixel into a dot signal by using the conversion cell designated to each inputted image; and
    reproducing an image on which gradation of the inputted image is expressed in a pseudo manner according to the dot signal.

12. A recording medium capable of being read by a computer, comprising a program to make the computer carry out:

a step for determining a pixel position of each inputted pixel on an inputted image in a pixel matrix when the pixel matrix of a predetermined size is applied to the inputted image;

a step for designating one of the plurality of conversion pixels contained in a conversion cell table to each inputted pixel according to the pixel position of each inputted pixel, wherein number of the conversion cells on the conversion cell table is smaller than number of pixels contained in the pixel matrix, and each conversion pixel has a piece of conversion information different at each conversion cell for converting a pixel value into a dot signal; and a step for converting the pixel value of each inputted pixel into a dot signal by using the conversion cell designated to each inputted image.

13. A recording medium capable of being read by a machine, comprising:

a conversion cell table containing a plurality of conversion cells, number of which is smaller than number of pixels contained in a pixel matrix of a predetermined size, each conversion cell having conversion information which is different at each conversion cell for converting a pixel value into a dot signal; and an index table for designating one of the conversion cells on the conversion cell table with respect to each in pixel position on the pixel matrix.

* * * * *